United States Patent
Aspen et al.

(10) Patent No.: US 6,301,200 B1
(45) Date of Patent: Oct. 9, 2001

(54) MAGNETO-OPTICAL DATA STORAGE DISC WITH HIGHLY CONDUCTIVE, SMOOTH REFLECTOR LAYER

(75) Inventors: Frank E. Aspen, St. Paul; Joseph H. Sexton, Oakdale, both of MN (US); Richard F. Willson, Hudson, WI (US)

(73) Assignee: Imation Corp., Oakdale, MN (US)

( * ) Notice: Subject to any disclaimer, the term of this patent is extended or adjusted under 35 U.S.C. 154(b) by 0 days.

(21) Appl. No.: 09/401,551

(22) Filed: Sep. 22, 1999

(51) Int. Cl.[7] .................................................. G11B 11/00
(52) U.S. Cl. ........................................... 369/13; 428/64.3
(58) Field of Search ................................... 369/13, 14, 110, 369/116; 300/59, 114; 428/64.3, 694 ML (56) References Cited

U.S. PATENT DOCUMENTS

| | | | |
|---|---|---|---|
| 4,897,320 | * | 1/1990 | Nomura et al. .......................... 369/13 |
| 5,325,351 | * | 6/1994 | Uchiyama et al. ................ 369/275.1 |
| 5,568,466 | * | 10/1996 | Komaki et al. .................... 369/275.2 |
| 5,604,005 | * | 2/1997 | Endo et al. .............................. 369/13 |
| 5,667,862 | * | 9/1997 | Nakane et al. .......................... 369/13 |
| 5,786,078 | * | 7/1998 | Sekiya et al. ........................... 369/13 |
| 5,912,061 | * | 6/1999 | Uchida et al. .......................... 369/13 |
| 6,064,632 | * | 5/2000 | Nakaoki et al. ........................ 369/13 |

FOREIGN PATENT DOCUMENTS

| | | | |
|---|---|---|---|
| 4231160 | * | 3/1993 | (DE) ....................................... 369/13 |
| 350010 | * | 10/1990 | (EP) ....................................... 369/13 |
| 10-320859 | | 12/1998 | (JP) . |

* cited by examiner

Primary Examiner—Tan Dinh
(74) Attorney, Agent, or Firm—Eric D. Levinson (57) ABSTRACT

An air-incident, optical data storage medium has a substrate, a reflector layer, a magneto-optic recording layer, and a protective layer. The reflector later has at least one of an electrical conductivity greater than about $5.0 \times 10^4$ $(\Omega\text{-cm})^{-1}$, an RMS surface roughness less than about 1.0 nm as measured by atomic force microscopy, and an index of refraction of less than about 0.5 at a read wavelength.

15 Claims, 5 Drawing Sheets

MAGNETO-OPTICAL DATA STORAGE DISC WITH HIGHLY CONDUCTIVE, SMOOTH REFLECTOR LAYER

FIELD OF THE INVENTION

The present invention relates to magneto-optic recording. More specifically, the present invention relates to a reflector layer for a magneto-optic (MO) disc.

BACKGROUND OF THE INVENTION

In magneto-optic recording, data is represented as a magnetic domain in a magnetizable recording medium such as a disc. Each domain is a stable magnetizable data site representative of a data bit. Data is written to the medium by applying a focused beam of high intensity light in the presence of a magnetic field. The disc typically includes a substrate, a magneto-optic recording layer, a reflective layer, and two or more dielectric layers.

In substrate-incident recording, the beam passes through the substrate before it reaches the recording layer. The reflective layer in a substrate-incident recording medium is formed on a side of the recording layer opposite the substrate. The reflective layer reflects the beam back to the recording layer, increasing overall exposure and absorption.

In near-field, air-incident recording, the beam does not pass through the substrate. Instead, the beam is incident on the recording layer from a side of the disc opposite the substrate. In an air-incident recording medium, the reflective layer is formed adjacent the substrate. A solid immersion lens (SIL) can be used to transmit the beam across an extremely thin air gap, and through the top of the recording medium to the recording layer. The SIL can be integrated with a flying magnetic head assembly. The air gap forms a bearing over which the flying head rides during operation. For near-field recording, the thickness of the air gap is less than one wavelength of the recording laser beam. Transmission of a portion of the beam is accomplished by a technique known as evanescent coupling.

For either substrate-incident or air-incident recording, the recording beam heats a localized area of a recording medium having perpendicular anisotropy above its Curie temperature to form a magnetic domain. The area is allowed to cool in the presence of a magnetic field to orient the growing domain. The magnetic field is strong enough to overcome the demagnetizing field of the recording medium, causing the localized domain to acquire a particular magnetization. The direction of the magnetic field and the resulting magnetization determine the data represented at the domain.

With light intensity modulation (LIM) recording techniques, the magnetic field is maintained in a given direction for a period of time as the beam power is selectively modulated across the recording medium to achieve desired magnetizations at particular domains. According to magnetic field modulation (MFM) recording techniques, the beam is continuously scanned across the recording medium while the magnetic field is selectively modulated to achieve the desired magnetization. Alternatively, the beam can be pulsed at a high frequency in coordination with modulation of the magnetic field.

To read the recorded data, the drive applies a lower intensity, plane-polarized read beam to the recording medium. Upon transmission through and/or reflection from the recording medium, the plane-polarized read beam experiences a rotation in polarization. The angle of rotation varies as a function of the magnetization of the localized area. An optical detector receives the read beam and translates the rotation angle into an appropriate bit value.

SUMMARY OF THE INVENTION

Increasing storage density is one of the main objectives of data storage system manufacturers because it results in lower cost per data unit for the consumer, allows greater storage capacity within a standard drive geometry, and can lead to new smaller drive formats. High data storage density and low cost currently drive the highly competitive data storage business.

One technique for increasing the storage density of optical recording media is to reduce the spot size of the light beam incident on the recording medium. The full-width-half-maximum (FWHM) of the focused light spot used for reading the storage media must be reduced to read back smaller marks. Thin film performance and engineering issues emerge both as a result of the reduced focused light spot area and as a result of the methods used for achieving the reduced light spot.

One problem that results from going to a smaller FWHM, for example, less than about 0.35 $\mu$m, is excessive heating of the media. Because the minimum laser read power is limited by system considerations such as laser and detector shot noise, reducing the FWHM leads to larger light power densities at the media surface. Increasing the light power density at the media surface becomes a critical problem when the stored data is corrupted at the higher temperatures associated with the higher power density.

Methods for achieving a smaller FWHM include both the use of an optical system with a very high numerical aperture (NA), and the use of near field optical techniques. Either of these methods may necessitate the use of an air incident medium. In systems that use air-incident media, the reading laser beam is incident onto the thin film side of the optical storage disc. Thus, the thin films in the layered stack on the disc are in reverse sequence from those in conventional substrate-incident MO recording media.

Reversing the sequence of layers in the stack has implications for several aspects of the media performance. One important aspect is the magnetic field sensitivity of the recording layer in the recording medium. The field sensitivity of the recording layer depends critically on the surface conditions, especially roughness, of the layer onto which it is deposited. When the layer sequence is reversed using conventional MO stack materials and processes, the field sensitivity is usually degraded (i.e., less sensitive in a magnetic field modulation writing scheme).

The present inventors have discovered a layer for an optical storage medium that includes: 1) materials selected to minimize the difficulties that result when increased power density is applied at the media surface; 2) surface structure designed to minimize the difficulties when field sensitivity is an issue; and 3) optical properties designed to maximize signal. This layer may be incorporated into a recording medium that has reduced susceptibility to high light intensity effects. This medium addresses the thermal requirements, as well as the associated magnetic and optical requirements, of a high-density optical storage system.

In one embodiment, the present invention is an air incident recording medium for use in an air-incident optical data storage system. An air incident medium includes an optical stack with layers in the following order: a substrate, a reflector layer, a magneto-optic recording layer, and a protective layer. The air incident medium of the present invention includes a reflective layer with an electrical conductivity greater than about $5.0\times10^4$ $(\Omega\text{-cm})^{-1}$. The reflective layer in the air incident medium of the present invention has an index of refraction (n) of less than about 0.5 at the wavelength used to read the medium. The reflector layer has a root mean square (RMS) surface roughness less than about 1.0 nm.

The reflective layer in the air incident medium of the present invention may be made of any material that has any of: (1) an electrical conductivity greater than about $5.0\times10^4$ $(\Omega\text{-cm})^{-1}$, (2) an index of refraction (n) of less than about 0.5 at the wavelength used to read the medium; or (3) a root mean square (RMS) surface roughness less than about 1.0 nm. Materials preferred for use as the reflective layer of the present invention include metallic compounds and their alloys such as, for example, copper, gold, silver, and aluminum. Copper and its alloys are particularly preferred.

This reflective layer provides improved read power sensitivity and field sensitivity in small FWHM applications in air-incident optical recording systems.

In another embodiment, the present invention is an air incident optical storage system in which data are recorded using the air incident medium described above.

In another embodiment, the present invention is an electronic device using the air incident optical storage device described above.

The details of one or more embodiments of the invention are set forth in the accompanying drawings and the description below. Other features, objects, and advantages of the invention will be apparent from the description and the drawings, and from the claims.

DETAILED DESCRIPTION OF THE PREFERRED EMBODIMENTS

Figure 1:
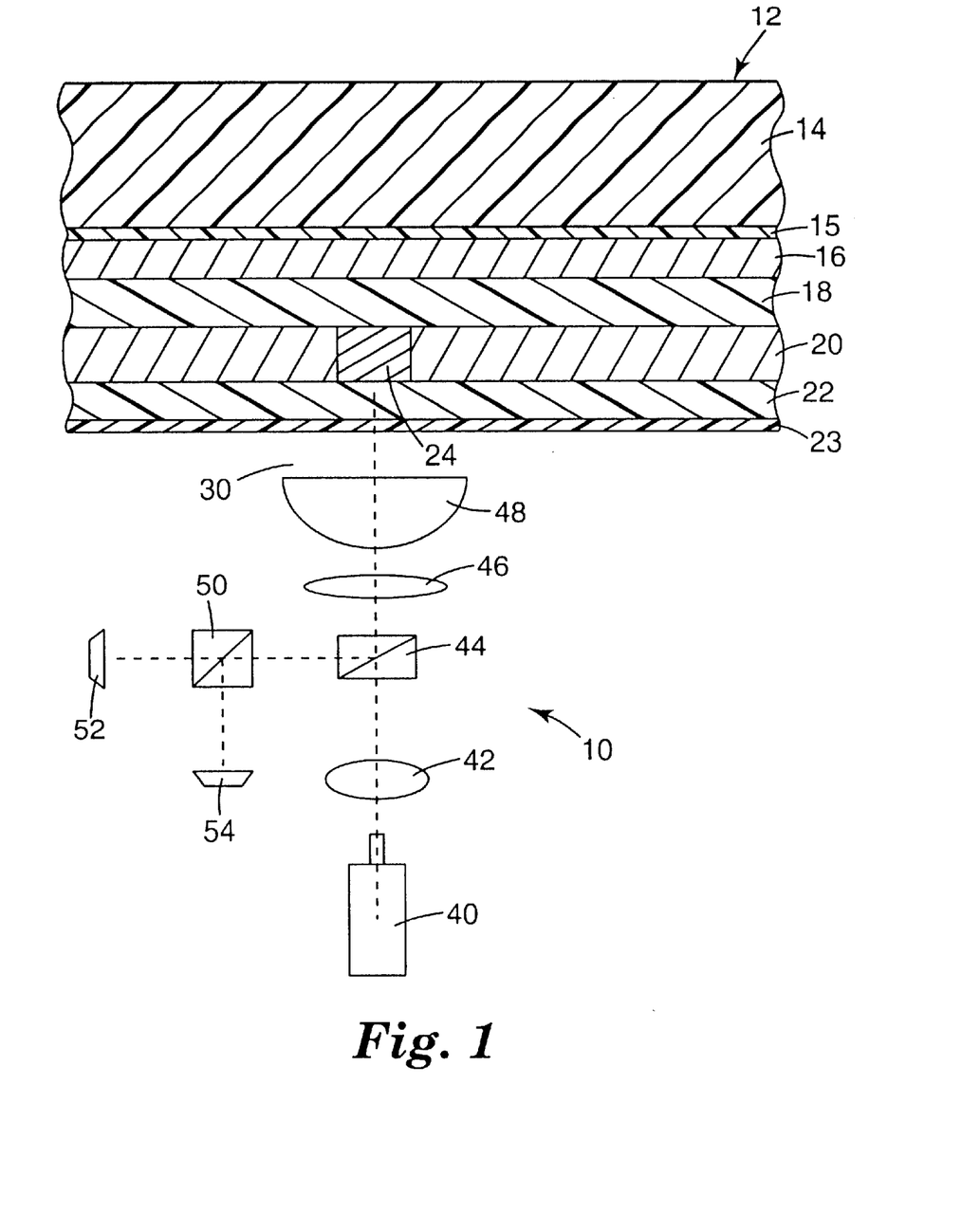
FIG. 1 is a schematic side view of an air-incident magneto-optic recording system of the present invention, and a cross-sectional view of an optical storage medium according to the present invention.

FIG. 1 illustrates an embodiment of an air-incident magneto-optical (MO) recording system 10. The system 10 records and reads data from an air incident storage medium 12. The term air incident medium as used herein means any storage medium that may be used with an air incident MO recording system. The system 10 further includes an optical arrangement with a laser 40, a condensing lens 42, beam splitters 44 and 50, an objective lens 46, a solid immersion lens (SIL) 48, and signal analyzers 52 and 54.

In operation, as shown in FIG. 1, laser 40 directs a beam of light through condensing lens 42. The beam then passes through first beam splitter 44 and is focused by lens 46 toward SIL 48. SIL 48 is spaced from medium 12 by an air gap 30 of less than the wavelength of the laser beam. The beam is transmitted into medium 12 and is focused to a point where a domain 24 will be formed, thereby heating the volume of the domain to the write temperature. A magnetic field source (not shown) provides a magnetic field which orients the magnetic material of domain 24 as it cools, thereby writing a bit.

Laser 40 preferably also operates at a lower energy intensity for reading medium 12. The light from laser 40 is reflected back from medium 12 toward first beam splitter 44. Upon reflection from medium 12, the polarization of the light is rotated clockwise or counterclockwise depending on the magnetic orientation of the medium. The light is then reflected by first beam splitter 44 toward second beam splitter 50, where the beam is divided by that beam splitter toward signal analyzers 52 and 54 depending on the direction of polarization and, therefore the information state of bit 24.

The air incident optical storage medium 12 includes the following layers in order of arrangement: a substrate 14, an optional adhesion promoting layer 15, a reflector layer 16, an optional spacer layer 18, a magneto-optic recording layer 20, a protective barrier layer 22, and an optional hard coat layer 23.

Light emitted from the laser 40 enters and exits the air-incident medium 12 on the side opposite from substrate 14. Because the beam does not enter disc 10 through substrate 12, the optical properties of the substrate have no direct optical effect on performance. In contrast, substrate-incident discs typically require substrates having particular optical properties. Thus, in an air-incident disc, it is conceivable that a wider array of materials may be used to fabricate substrate 14. Also, such materials could be less expensive than higher-grade optical materials. For example, substrate 14 can be formed from a variety of materials including thermosets, thermoplastics, metal, or glass. The selected materials can be transparent or opaque. Also, such materials could be selected in part on the basis of the applicable elastic modulus of the material for enhanced rigidity relative to more typical substrate materials for optical discs. For optical recording, however, it is typically desirable to form a physical format on substrate 14 to facilitate optical tracking. Therefore, it may be most desirable to form substrate 14 from a material that can be readily replicated with a physical format in a mold.

Recording layer 20 is made of one or more layers of rare earth transition metal alloy. Examples include materials such as FeTbCo, FeTbCoTa (e.g., 67% Fe, 23.5% Tb, 8.0% Co, and 1.5% Ta), or gadolinium-iron-cobalt (GdFeCo). In the present application, the percentages will refer to atomic percent (At %).

Optional spacer layer 18 may be included for the purpose of tuning the optical and thermal response of the medium. Spacer layer 18 can be formed of any of a variety of dielectric materials including silicon carbide, silicon nitride, and silicon dioxide. Spacer layer 18 preferably has a thickness of about 0 nm to about 3 nm. Preferably, the spacer layer 18 is not included in the optical disc of the present invention.

Protective barrier layer 22 may be made from the same materials as spacer layer 18. Protective layer 22 preferably has a thickness of about 10 nm to about 200 nm, more preferably about 10 nm to about 100 nm.

The reflector layer 16 of the present invention includes materials with specific optical properties. Any material that exhibits these optical properties may be used in the reflector layer of the present invention.

The reflector layer 16 should be made of a material with a very low index of refraction (n) values at the wavelength at which the medium is read, referred to herein as the read wavelength. The index of refraction of the reflector layer 16 should be less than about 0.5 at the read wavelength. Preferably, the index of refraction, measured at the read wavelength, should be between about 0 and about 0.3, more preferably between about 0 and about 0.1.

The materials used in the reflector layer 16 of the present invention should have electrical conductivities above about $5 \times 10^4$ $(\Omega\text{-cm})^{-1}$, and more preferably above about $1 \times 10^5$ $(\Omega\text{-cm})^{-1}$.

A smoother surface of reflector layer 16 yields a better write magnetic field sensitivity. Reflector layer 16 preferably has a root mean square (RMS) surface roughness less than about 1.0 nm, and, more preferably, less than about 0.75 nm, as measured using an atomic force microscope (AFM).

Preferred materials for use in the reflective layer of the present invention include copper (Cu) and gold (Au). The Cu and Au may be substantially pure or alloyed and/or mixed with each other or with other conductive metals, such as, for example, aluminum (Al) and silver (Ag). Copper and its alloys are particularly preferred. Dilute alloys of copper such as CuAl and CuAu, and dilute alloys of gold may be used in the present invention.

As noted above, the reflector layer 16 may be applied over any number of optional sub-layers 15 to modify its properties, for example, to promote adhesion to a particular substrate. Suitable materials for the sub-layers 15 include, for example chromium (Cr), titanium (Ti), nickel (Ni) and alloys and/or mixtures thereof.

The reflector layer 16 preferably has a thickness such that there is sufficient reflectivity to obtain an adequate MO signal, and sufficient thermal conductance to prevent corruption of data due to overheating when the medium is read by the laser. This thickness range is preferably between about 20 nm and about 200 nm, and more preferably between about 30 nm and about 100 nm.

The air incident optical storage medium described above may be used as a component in any air incident recording apparatus. The optical recording system including the air incident storage medium may be used as a mass storage device in a wide variety of conventional electronic devices, including, for example, digital computers.

The present invention will now be further illustrated by the following non-limiting examples. (All measurements are approximate.)

EXAMPLE 1

(1) Surface Roughness of Cu Reflector Layers

To investigate the RMS surface roughness of reflector layer 16 according to the present invention, six thin film samples were prepared: aluminum (Al) on a glass substrate and on a silicon (Si) substrate, aluminum-chromium AlCr (98% Al, 2.0% Cr) on glass and Si, and copper (Cu) according to the present invention on glass and Si.

The Cu, Al, and AlCr thin film samples were deposited under identical process conditions: 2 millitorr argon (Ar) sputter gas pressure and a regulated cathode current of 0.35 A. These conditions are within the typical operating range of DC magnetron sputter guns. The same 7.6 cm diameter DC magnetron sputter source was used for each of the Cu, Al, and AlCr depositions. The Si and Glass substrates were mounted on a planetary system located 7.6 cm from the sputter source target. The substrates were cleaned in a glow discharge prior to deposition. No adhesion-promoting layers were used. The duration of the depositions was set to give a film thickness of 70 nm for each of the materials. No oxide, nitride, or other protective coatings were put on the samples.

Subsequent profilometry showed the average thickness of each samples to be within 1% of 70 nm, and thickness uniformity of better than 3% was achieved over the surface of the substrates.

Atomic force microscopy (AFM) analysis was used to measure the RMS roughness of each of the films. (For a purely sinusoidal surface profile: $2^{3/2} \times$(RMS value)=peak-to-peak amplitude) The results are shown in Table 1 below. The RMS surface roughness for the copper reflector layers is significantly lower than those for the Al and AlCr reflector layers.

(2) Surface Roughness of Au Reflector Layers

To investigate the RMS surface roughness of an Au reflector layer 16 with an adhesion-promoting sub-layer 15, thin film samples were prepared on both $Si_{100}$ substrates and on glass substrates. During thin film deposition the substrates were mounted opposite from the Au and Cr sputter sources on a planetary system located 10 cm from the sputter sources. During deposition the planetary performed planetary motion to provide improved thickness uniformity of the deposited thin films. The thin films were prepared by first sputter depositing a 4 nm thick layer of Cr onto the substrates, followed by 70 nm of Au. Both the Cr and Au layers were sputtered with 3 inch (8 cm) diameter DC magnetron sputter sources in 2 millitorr of Ar. The sputter power for both the Cr and Au was 100 W. No oxide, nitride, or other protective coatings were put on the samples.

AFM analysis was used to measure the RMS roughness of each of the thin film samples. The RMS roughness values for both of the samples are shown in Table 1. These RMS roughness values demonstrate that, like the Cu films in this example, the Au films with the Cr sublayers are very smooth relative to the conventional optical disk reflector materials such as AlCr and Al.

TABLE 1

| Sample | AV Surface Roughness (RMS) Value |
|---|---|
| AlCr on glass | 2.315 nm |
| AlCr on Si | 2.212 nm |
| Al on glass | 2.581 nm |
| Al on Si | 2.839 nm |
| Cu on glass | 0.728 nm |
| Cu on Si | 0.659 nm |
| Cr/Au on glass | 0.713 nm |
| Cr/Au on Si | 0.670 nm |

EXAMPLE 2

The Figure of Merit (FOM) was calculated and used to compare the performance of thin film media with different reflector materials at the read wavelength of 680 nm. The FOM is a useful performance indicator because it is proportional to the read signal. For a media noise limited system, the FOM is $R(\theta^2 + \in^2)^{1/2}$, where R is the reflectivity, $\theta$ is the Kerr rotation, and $\in$ is the Kerr ellipticity. The FOM calculations were performed using an optical modeling program available under the trade designation DIFFRACT from MM Research Inc., Tucson, Ariz. This program uses a finite-difference time-domain method for solving Maxwell's equations over extended, complex optical systems. The optical system and film stack configuration used in the FOM calculations is shown schematically in FIG. 1.

Referring to FIG. 1, note that the optical configuration used for the FOM calculations includes SIL 48 above medium 12 with an air gap 30 between the SIL and the medium. The air gap 30 in all of the FOM calculations is 100 nm.

Again referring to FIG. 1, in one FOM comparison, media 12 having a 60 nm Cu reflector layer 16 are compared to media having a 60 nm AlCr reflector layer. In these media, the MO recording layer 20 comprised TbFeCo and had thickness values of 10, 16, and 21 nm, and spacer layer 18 comprised $SiO_2$ and had thickness values of 0, 10, and 20 nm. The $SiN_x$ layer thickness was fixed at 40 nm for all of the media stacks. The FOM values for these eighteen stack configurations are plotted in FIG. 2.

Figure 2:
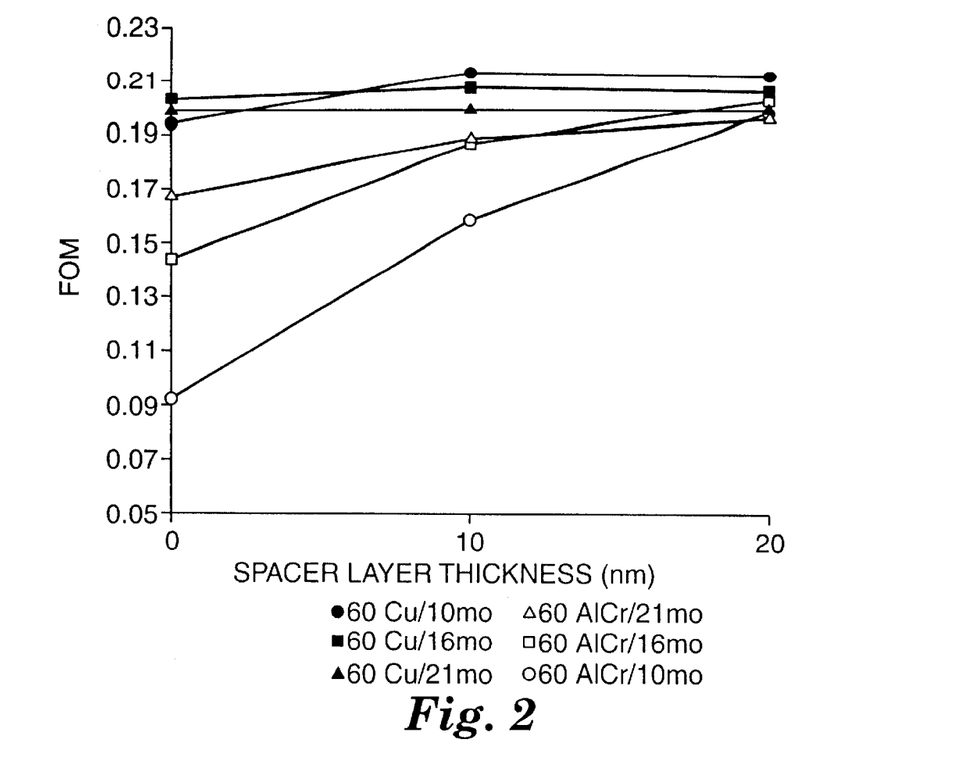
FIGS. 2 and 3 are graphs of the calculated magneto-optic Figure of Merit (FOM) as a function of spacer and $SiN_x$ layer thicknesses, respectively, for the optical storage media of Example 2.

The results of FIG. 2 demonstrate that: (1) as the spacer 18 thickness goes to zero, an air-incident stack with a Cu reflector 16 is optically superior to one with an Al reflector; and (2) the margin of superiority grows rapidly as the recording layer thickness is reduced. This second point is important because thinner recording layers are advantageous for meeting other critical performance requirements such as field response.

In another FOM comparison, optical stacks with a 60 nm Cu reflector layer 16 were again compared to stacks with a 60 nm AlCr reflector layer, except that the TbFeCo 20 and $SiO_2$ 18 layer thicknesses were held fixed at 16 nm and 0 nm respectively, and the $SiN_x$ layer 22 thickness was varied from 20 nm to 150 nm. These results are plotted in FIG. 3.

Figure 3:
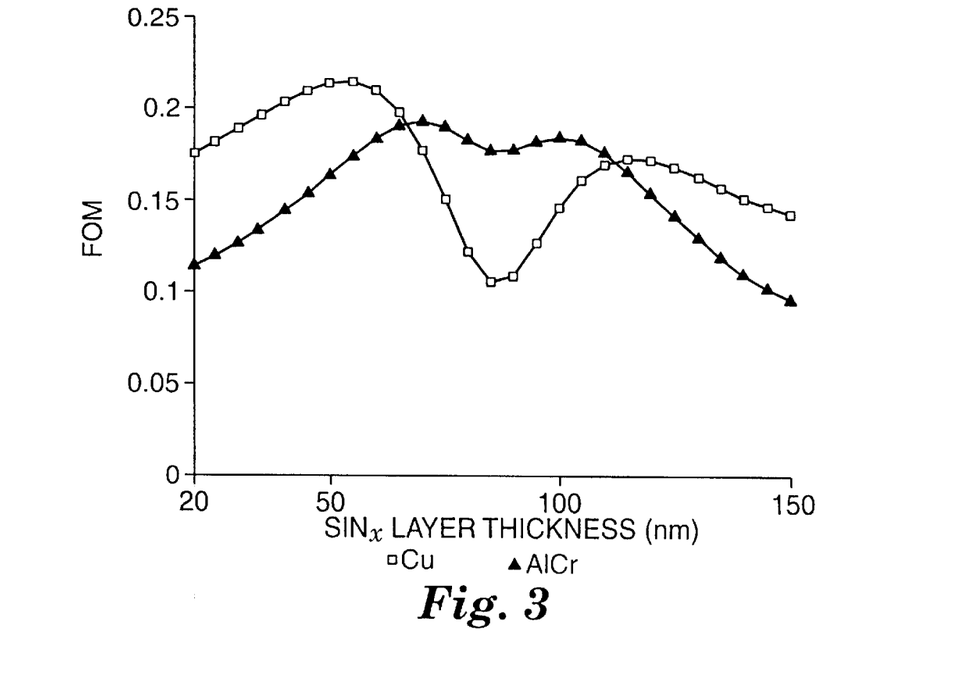

The results in FIG. 3 show that the largest FOM values overall are obtained with a Cu reflector when the $SiN_x$ thickness is in a range of 35 to 60 nm. Often it is desirable from both manufacturing and other performance point-of-views to have a $SiN_x$ thickness less than 60 nm. FIG. 3 shows that for $SiN_x$ thicknesses less than 60 nm, the FOM with a Cu reflector is superior to that of the AlCr reflector.

EXAMPLE 3

Referring to FIG. 1, a first thin film stack was prepared by first sputter-depositing a 6 nm Cr adhesion promoting layer onto a substrate 14. Next, a 50 nm Cu reflector layer 16 was sputter-deposited. This was followed by sputter deposition of a 13 nm TbFeCoTa (22.5% Tb, 67% Fe, 8.5% Co, 2% Ta) MO recording layer 20, and then a $SiN_x$ layer 22 was sputter-deposited onto the MO recording layer 20. A second thin film stack was prepared which was identical to the first thin film stack, except that the reflector layer 16 consisted of 100 nm of sputter-deposited AlTi (98.5% Al, 1.5% Ti), and the record layer 20 consisted of 19 nm of TbFeCoTa.

To assess the difference in thermal properties of the first and second thin film stacks, the carrier-to-noise ratio (CNR) was measured as a function of laser write power, i.e., a "write power scan." The write power scan is used to determine the write power threshold of the media. The write power threshold is the write power when the CNR increases sharply from a near-zero level. The write power threshold value is very sensitive to the rate with which heat can be removed from the recording layer during the write process and hence the thermal conductivity of the reflector layer adjacent to the recording layer. These measurements were made using near field writing with LIM and near field readback on a dynamic tester as schematically described in FIG. 1. The test conditions were: 6.8 m/s surface velocity, 6.75 MHz laser write pulse frequency, and 32% duty cycle.

These conditions resulted in a 0.50 µm bit size. The write field was +120 Oe and the erase field was −120 Oe.

Figure 4:
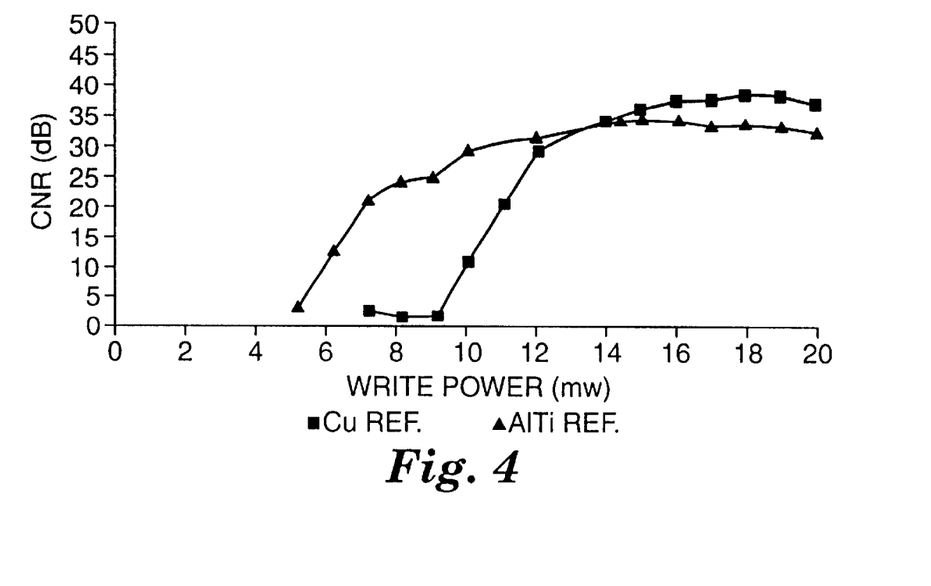
FIG. 4 is a graph of measured carrier-to-noise ratio (CNR) as a function of write power for the optical storage media of Example 3.

FIG. 4 shows write power scans for the first and second thin film stacks. FIG. 4 shows that the write power threshold for the first thin film stack (with the 50 nm Cu reflector) was about 10 mW, and that for the second thin film stack (with the 100 nm AlTi reflector) was about 5 mW. A 5 mW difference in write thresholds between the first and second thin film stacks is considered very large and it occurs even though the AlTi layer is twice the thickness of the Cu layer. The large difference can be attributed to the high thermal conductivity of the Cu reflector. This comparison clearly illustrates the effectiveness of using a Cu reflector for reducing write power sensitivity and likewise reducing deleterious read power effects when a high intensity read beam is required such as in the case of near field reading with a SIL lens. Also, in FIG. 4, note that the maximum CNR of the stack with the Cu reflector is ~5 dB higher than that of the stack with the AlTi reflector, presumably in part due to improved optical performance alluded to in Example 2.

EXAMPLE 4

Again referring to the first and second thin film stacks of Example 3, field sensitivity differences for these samples were assessed by measuring CNR as a function of recording field for each of them. In these measurements, a data track was erased at a field of given magnitude and direction and then written with LIM, with the same field magnitude but in the opposite direction as the erase field. This procedure was carried out for field magnitudes ranging from 0 to 320 Oe. The field sensitivity is assessed by how sharply the CNR increases with field magnitude and by the magnitude of the minimum field required to reach maximum CNR. As in Example 3, these measurements were made using near field writing and near field readback on a dynamic tester as schematically described in FIG. 1. The test conditions were: 6.8 m/s surface velocity, 6.75 MHz laser write pulse frequency, and 32% duty cycle. These conditions resulted in a 0.50 µm bit size.

Figure 5:
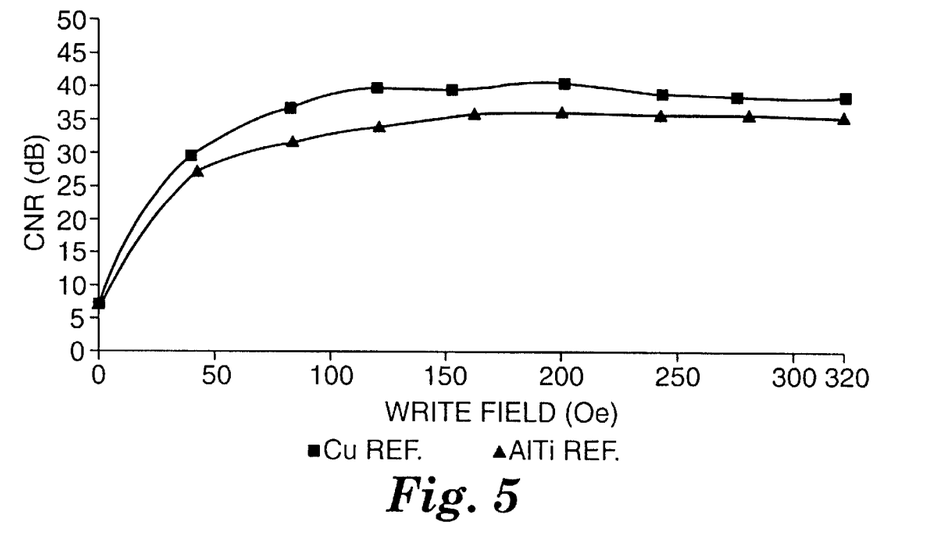
FIG. 5 is a graph of measured CNR as a function of write field strength for the optical storage media of Example 3.

FIG. 5 gives a comparison of CNR vs. (write/erase) field for the first (Cu reflector) and second (AlTi reflector) thin film stacks of Example 3. FIG. 5 shows that the first film stack achieves its maximum CNR value of 40 dB at a field of 120 Oe, whereas the second film stack achieves a maximum CNR of 37.3 dB at a field of 200 Oe. Clearly the Cu reflector increases sensitivity to write field. Adequate write field sensitivity is critical for achieving needed CNR when recording with the low fields used in the MFM recording method (~+/−100 Oe). The increased field sensitivity of the first film stack over the second film stack can be attributed to the increased smoothness of the Cu surface upon which the record layer is coated. This is an unexpected and novel result.

EXAMPLE 5

Referring to FIG. 1, a first thin film stack was prepared by sputter depositing onto a flat polycarbonate substrate, in sequence:

1. a 5 nm thick Cr adhesion-promoting layer 15;
2. a 40 nm thick Au reflector layer 16;
3. a 3 nm thick $SiN_x$ spacer layer 18;
4. a 20 nm thick rare earth-transition metal (RETM) alloy recording layer 20 of composition $Tb_{18}Fe_{77}Co_5$; and finally,
5. an 85 nm thick $SiN_x$ dielectric layer 22.

In steps 1) and 2), the Cr layer 15 and the Au layer 16 were coated with a DC magnetron in Ar. In steps 3) and 5) the SiN$_x$ layers were reactively coated using a pulsed DC magnetron with a Si target in an Ar—N$_2$ mixture. In step 4) the RETM record layer was co-sputtered from DC magnetrons with Tb and FeCo targets in Ar.

A second thin film stack was coated onto a flat polycarbonate substrate in the same way as the first thin film stack except that in step 2) 40 nm of AlCr was used as the reflector 16 instead of 40 nm of Au.

A third thin film stack was fabricated which consisted of only the first two layers of the first thin film stack: a 5 nm thick Cr adhesion-promoting layer and a 40 nm Au reflector layer 16 coated in that sequence onto a flat polycarbonate substrate. These layers were coated with the same processes used for the first two layers of the first film stack.

A fourth thin film stack was fabricated which consisted of only the first two layers of the second thin film stack: a 5 nm thick Cr adhesion-promoting layer and a 40 nm AlCr reflector layer 16 coated in that sequence onto a flat polycarbonate substrate. These layers were coated with the same processes used for the first two layers of the second film stack.

An AFM was used to measure the RMS surface roughness of the third and fourth thin film stacks and of an uncoated flat polycarbonate substrate. The results are compared in Table 2 below:

TABLE 2

| Sample | RMS roughness |
|---|---|
| Cr/Au (third stack) | 0.773 nm |
| Cr/AlCr (fourth stack) | 1.733 nm |
| uncoated flat polycarbonate substrate | 0.375 nm |

The Au surface was significantly smoother than the AlCr surface. Since the spacer layers in the first and second thin film stacks are only 3 nm thick it is expected that the surface roughness of these stacks subsequent to the spacer layer depositions will be very close to the values shown in the above table for the respective stacks. To assess the effects of this surface roughness on the field sensitivity of the first and second thin film stacks, measurements were made of the CNR dependence on the write magnetic field for each of the stacks.

Figure 6:
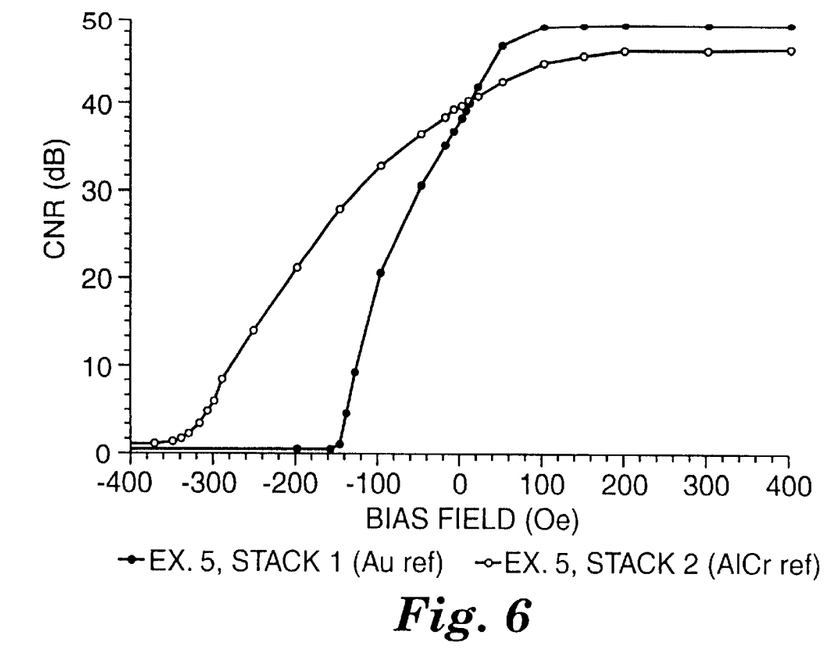
FIG. 6 is a graph of the CNR as a function of write magnetic field for the optical storage media of Example 5.

CNR vs. write field measurements were made dynamically using the LIM recording technique on an optical disk spin stand with far field optics. The testing was done at a laser wavelength of 830 nm and an objective for air-incident recording with an NA of 0.6 was used. The test procedure used a carrier frequency of 3.7 MHz, a write pulse width of 70 ns, and a media velocity of 5.65 m/s. The mark length was 0.76 um. The laser power for the write process was determined by a preliminary CNR optimization. The CNR was obtained with conventional measurement techniques using a spectrum analyzer. A 300 kHz frequency interval centered on 3.7 MHz was used for the noise measurement. CNR was measured using write magnetic fields spanning the range necessary to generate read back signals having from 0 to 1 dB CNR up to or beyond the peak CNR. The data is plotted in FIG. 6. It is seen that the field onset for writing on the film stack with the Au reflector is close to −150 Oe whereas for the film stack with the AlCr reflector it is close to −350 Oe. Also it is seen that the CNR for the film stack with the Au reflector plateaus at close to 100 Oe, whereas for the film stack with the AlCr reflector it plateaus at close to 200 Oe. It is clear that significantly less field is required both to fully erase and to fully write the film stack with the smoother reflector. It is also observed that the maximum CNR of the film stack with the Au reflector is about 3.5 dB higher than that of the film with the AlCr reflector.

EXAMPLE 6

Referring to FIG. 1, a first thin film stack was prepared by sputter depositing onto a flat polycarbonate substrate, in sequence:

1) a 5 nm thick Cr adhesion-promoting layer 15;
2) a 40 nm thick Au reflector layer 16;
3) a 3 nm thick SiN$_x$ spacer layer 18;
4) a 16 nm TbFeCo alloy layer comprising the first layer of a bilayer record layer 20;
5) a 4 nm TbFeCo alloy layer comprising the second layer of the bilayer record layer 20; and
6) an 85 nm thick SiN$_x$ dielectric layer 22.

In steps 1) and 2), the Cr layer 15 and the Au layer 16 were coated with a DC magnetron in Ar. In steps 4) and 5) the TbFeCo layers were co-sputtered from DC magnetrons with Tb and FeCo targets in Ar. In steps 3) and 6) the SiN$_x$ layer was reactively coated using a pulsed DC magnetron with a Si target in an Ar—N$_2$ mixture.

A second thin film stack was coated onto a flat polycarbonate substrate in the same way as the first thin film stack except that in step 2) 40 nm of AlCr was used as the reflector 16 instead of 40 nm of Au.

Figure 7:
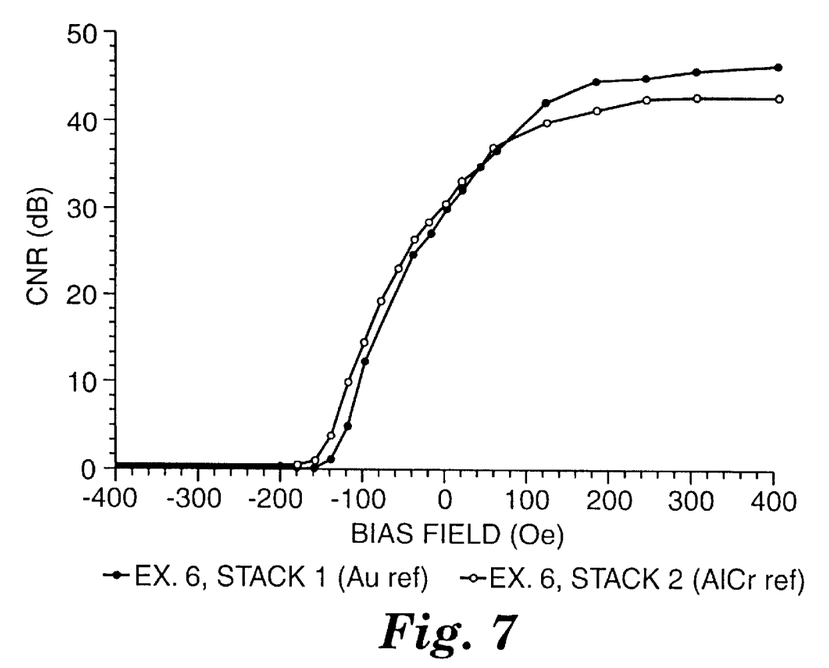
FIG. 7 is a graph of the CNR as a function of write magnetic field for the optical storage media of Example 6.

CNR vs. write field measurements were made on both of these thin film stacks using the LIM recording technique on an optical disk spin stand with far field optics. The testing was done at a laser wavelength of 830 nm and an objective for air-incident recording with an NA of 0.6 was used. The test procedure used a carrier frequency of 3.7 MHz, a write pulse width of 70 ns, and a media velocity of 5.65 m/s. The mark length was 0.76 um. The laser power for the write process was determined by a preliminary CNR optimization. The CNR was obtained with conventional measurement techniques using a spectrum analyzer. A 300 kHz frequency interval centered on 3.7 MHz was used for the noise measurement CNR was measured using write magnetic fields spanning the range necessary to generate read back signals having from 0 to 1 dB CNR up to or beyond the peak CNR. The data are plotted in FIG. 7. It is seen that the field onset for writing on the film stack with the Au reflector is close to −70 Oe whereas for the film stack with the AlCr reflector it is close to −80 Oe. The 10 Oe improvement in field onset using Au vs. AlCr is significant for MFM writing applications since it is a significant fraction of an MFM head field. Also it is seen that the peak CNR for the film stack with the Au reflector is about 3.5 dB higher than for the film stack with the AlCr reflector.

EXAMPLE 7

Referring to FIG. 1, a thin film stack was prepared by first sputter deposition onto a flat polycarbonate substrate, in sequence:

1) a 4 nm thick Cr adhesion-promoting layer 15;
2) a 52.5 nm Au reflector layer 16;
3) a 16 nm TbFeCo alloy layer comprising the first layer of a bilayer record layer 20;
4) a 4 nm TbFeCo alloy layer comprising the second layer of the bilayer record layer 20;
5) a 62 nm SiN$_x$ dielectric layer 22; and,
6) a 3 nm carbon-nitride hard coat layer 23.

In steps 1) and 2), the Cr layer 15 and the Au layer 16 were coated with a DC magnetron in Ar. In steps 3) and 4) the TbFeCo layers were co-sputtered from DC magnetrons with Tb and FeCo targets in Ar. In step 4) the $SiN_x$ layer was reactively coated using a pulsed DC magnetron with a Si target in an $Ar-N_2$ mixture.

To assess the record performance of this sample, the CNR was measured using the MFM recording technique. The MFM record technique uses write fields much smaller than those used with the LIM recording technique and the CNR of MFM-recorded information is very sensitive to the write field sensitivity of the recording thin film stack. In these measurements the magnitude of the MFM write field was only 77 Oe. On a dynamic tester using near field recording (schematically described in FIG. 1), a track of domains of length 1.3 um was recorded in the above described thin film stack at a surface velocity of 10.1 m/s. CNR was measured using a 300 kHz frequency interval for the noise measurement. A CNR of 49.97 dB was achieved. This result indicates that the write field sensitivity for this record stack is such that a read back CNR of at least 49.97 dB can be achieved with an MFM record field as low as 77 Oe.

Figure 8:
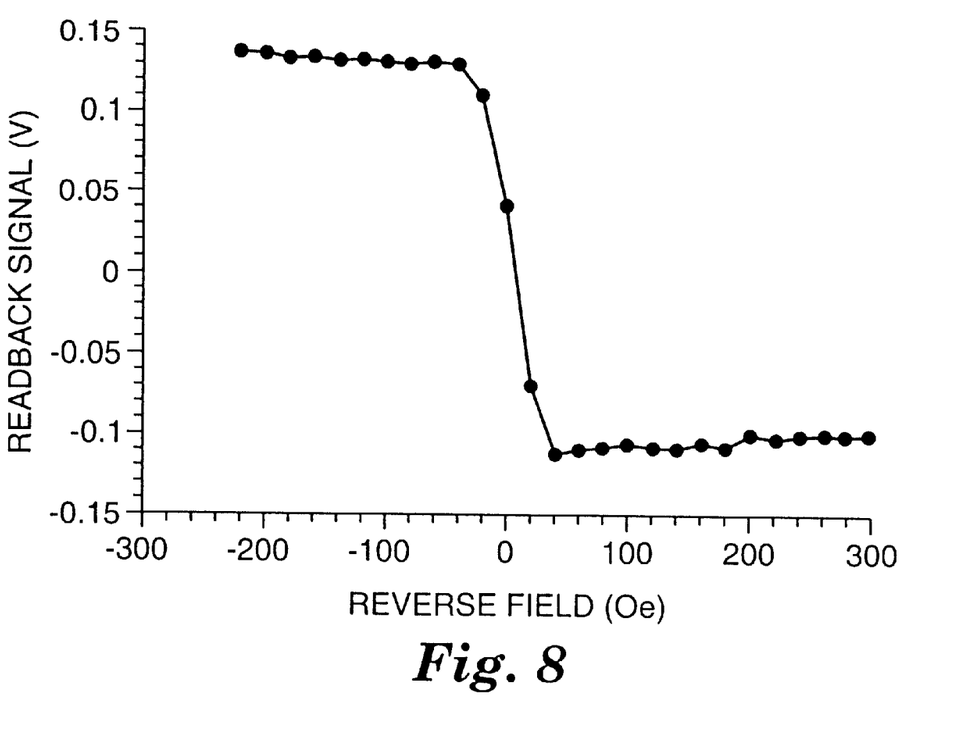
FIG. 8 is graph of the read voltage as a function of reverse magnetic field for the optical storage media of Example 7.

To further assess the write field sensitivity of this thin stack, dynamic measurements were made to determine how much applied field was required to thermomagnetically reverse the magnetization of an erased track. This was done by iteratively writing a DC level to orient the record layer in one magnetization direction and then attempting to rewrite a DC level of the opposite polarity, magnetizing the record layer in the opposite direction, with a range of write fields; the write fields covering a range necessary to generate the result of no magnetization reversal and the result of complete magnetization reversal along with all of the intermediate magnetization state results. Using this technique the field sensitivity can be considered to be half of the field range from the point where the record layer begins to reverse to point where it is completely reversed, since this would be the minimum magnitude of an MFM record field needed to alternately write domains of opposing magnetization directions in the limit of long domains. The read back signal of the written track was used to determine if the magnetization has been reversed. The laser power for the write process is determined by CNR optimization. See FIG. 8. From these results it was observed that the write field sensitivity of the thin film stack described above was 40 Oe.

EXAMPLE 8

Referring to FIG. 1, the thin film stack was prepared by first sputter depositing onto a polycarbonate substrate, in sequence:

1) a 5 nm thick Ti adhesion-promoting layer 15;
2) a 50 nm Au reflector layer 16;
3) a 20 nm thick TbFeCo alloy layer 20; and
4) a 55 nm thick $SiN_x$ dielectric layer 22.

The resulting thin film stack was then subjected to an environment of 85% relative humidity at 80° C. for 500 hours. Subsequent visual observation revealed no observable corrosion sites on the sample.

A number of embodiments of the present invention have been described. Nevertheless, it will be understood that various modifications may be made without departing from the spirit and scope of the invention. Accordingly, other embodiments are within the scope of the following claims.

What is claimed is:

1. An air-incident optical data storage medium comprising the following layers, in order:

a substrate;

a reflector layer;

a magneto-optic recording layer; and a protective layer;

wherein the reflector layer has the following properties:
   an electrical conductivity greater than about $5.0 \times 10^4$ $(\Omega\text{-cm})^{-1}$;
   a RMS surface roughness less than about 1.0 nm as measured by atomic force microscopy; and
   an index of refraction of less than about 0.5 at a read wavelength.

2. The medium of claim 1, wherein the reflector layer has an RMS surface roughness of less than about 0.75 nm.

3. The medium of claim 1, wherein the reflector layer comprises copper.

4. The medium of claim 1, wherein the reflector layer comprises a copper alloy.

5. The medium of claim 1, wherein the reflector layer comprises gold.

6. The medium of claim 1, wherein the reflector layer comprises a gold alloy.

7. The medium of claim 1, wherein the reflector layer has an index of refraction, n, less than about 0.3 at the read wavelength.

8. The medium of claim 1, wherein the reflector layer is adjacent the recording layer.

9. The medium of claim 1, further comprising a spacer layer between the reflector layer and the recording layer.

10. The medium of claim 1, wherein the recording layer comprises a rare earth transition metal alloy.

11. The medium of claim 10, wherein the medium has a Figure of Merit (FOM) greater than about 0.22.

12. The medium of claim 10, wherein the carrier-to-noise ratio (CNR) is greater than about 45 dB as measured with 0.8 $\mu$m domains.

13. The medium of claim 12, wherein the write field sensitivity is such that for an MFM recorded signal with a head field magnitude of about 77 Oe, a CNR of at least 48 dB is achieved for 1.3 $\mu$m domains.

14. The medium of claim 12, wherein the magnitude of the write field onset when measured using LIM is greater than or equal to about 70 Oe and less than or equal to about 150 Oe.

15. The medium of claim 12, wherein the magnitude of the write field onset, when measured by over-writing opposite DC levels, is greater than or equal to about 40 Oe.

* * * * *